Nov. 22, 1927.

S. NATHAN

CAMP STOVE BURNER

Filed May 19, 1926

Inventor
SAMUEL NATHAN
By
Attorney

Patented Nov. 22, 1927.

1,650,148

UNITED STATES PATENT OFFICE.

SAMUEL NATHAN, OF LOS ANGELES, CALIFORNIA, ASSIGNOR OF ONE-FOURTH TO WILLIAM KLINGSTEIN AND ONE-FOURTH TO DAVID HART, BOTH OF LOS ANGELES, CALIFORNIA.

CAMP-STOVE BURNER.

Application filed May 19, 1926. Serial No. 110,237.

A purpose of my invention is the provision of a camp stove burner characterized by its simplicity, durability and cheapness, and its ability to produce flames of different sizes or diameters for generating various degrees of heat so as to render it adaptable for the heating of vessels of different sizes and their contents.

It is also a purpose of my invention to provide a camp stove burner having a plurality of wicks each consisting of a homogeneous mass composed of disintegrated asbestos and a suitable binder, such as cement, the composition producing a wick having a high degree of absorption for any suitable fuel, such as alcohol, and incapable of deterioration in its normal use.

I will describe only one form of camp stove burner embodying my invention and will then point out the novel features thereof in claims.

In the accompanying drawings.

Figure 1:
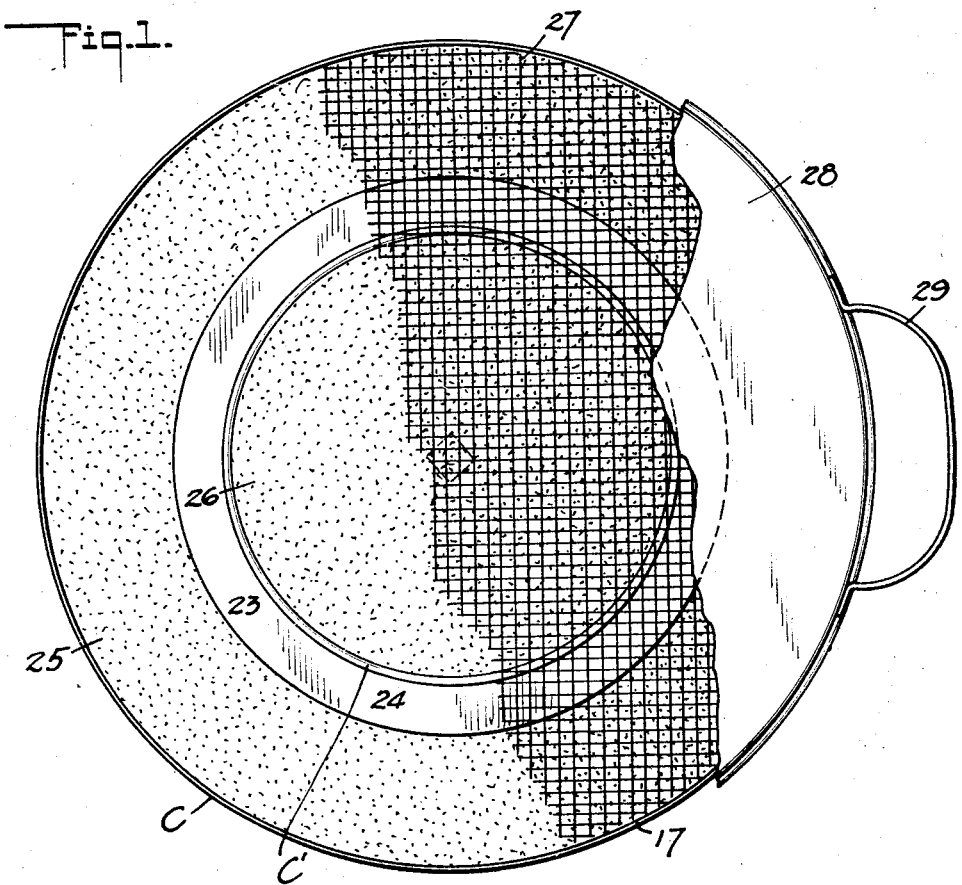
Figure 1 is a view showing in top plan one form of camp stove burner embodying my invention with portions thereof broken away.

Referring specifically to the drawings, my invention, in its present embodiment, comprises an outer container C constructed of metal or other suitable material and of cup-shaped form, the container comprising a bottom 15 of disk form having its edge bent to form a channel 16 in which is secured an annulus 17. Within the container C is a second and smaller container C' also constructed of metal and of cup form, the second container comprising a bottom 18 having its edge bent to form a channel 19 in which is secured an annulus 20. A screw bolt 21 extends through the bottoms 15 and 18 of the two containers and carries a nut 22 by which the inner container can be fixedly secured concentrically within the outer container.

Figure 2:
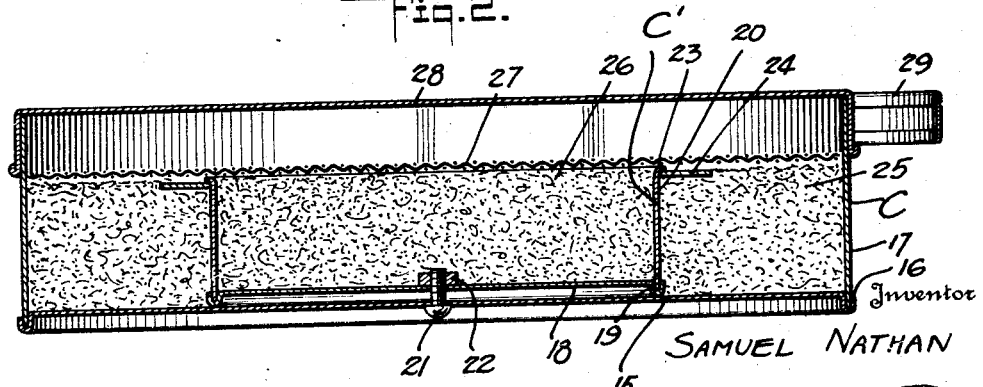
Figure 2 is a central vertical sectional view of the burner shown in Figure 1.

As shown in Figure 2, the upper portion of the annulus 20 is flared outwardly, as indicated at 23, and soldered or otherwise secured to this flared edge is an annular lip 24, the purpose of which will be described hereinafter. Between the outer container and the inner container, a wick 25 is arranged, while within the inner container is a second wick 26. These wicks, in the present instance, are formed of a combination of disintegrated asbestos or asbestos fiber and a suitable binder, such as cement, preferably in the combination of one part cement and nine parts asbestos. Wicks formed in this manner provide a homogeneous mass which is highly absorbent of fuel, such as alcohol, so that they can be readily saturated with the fuel. Above the wicks 25 and 26 is a disk of foraminous material 27 which is fitted within the outer container so as to provide a protecting medium for the wicks. The outer container is adapted to be closed by a cover 28 provided with a handle 29 which facilitates the application and removal of the cover to or from the container, as will be understood.

In practice, the burner can be used for heating large or small vessels, and in the heating of small vessels the wick 26 is saturated with a suitable fuel, such as alcohol, and then ignited to produce a flame of circular cross section, so as to heat a vessel placed above the foraminous material 27. Should it be desired to heat a larger vessel, both of the wicks 25 and 26 are supplied with alcohol or other fuel and ignited so that they combine in producing a flame of relatively large cross sectional area suitable for heating a large vessel.

It is to be particularly noted that when the inner wick 26 is burning, the annular lip 24 serves to prevent the wick 25 from being accidentally lighted, while if, on the other hand, it is desired to only use the outer wick 25 the lip will serve to prevent accidentally lighting the inner wick 26. Either or both wicks can be readily extinguished by placing the cover 28 on the outer container, thus excluding the air and extinguishing the flame. It will, of course, be understood that in actual use the burner is placed beneath a suitable grate upon which the vessel to be heated is supported in spaced relation to the burner to allow the proper functioning of the burner flame.

Although I have herein shown and described only one form of camp stove burner embodying my invention, it is to be understood that various changes and modifications may be made therein without departing from the spirit of the invention and the spirit and scope of the appended claims.

I claim as my invention:

1. A camp stove burner comprising a cupped container of one diameter and a second cupped container of a smaller diameter within the first container and concentric therewith, an annular wick in the outer container, a circular wick in the inner container, and an annular lip on the inner container overlying that portion of the wick in the outer container adjacent the inner container.

2. A camp stove burner comprising a pair of containers one within the other, wicks one in each of the containers, and a lip extending from the inner container to overlie that portion of the wick in the outer container adjacent the inner container and disposed substantially flush with the top surface of the wick in the outer container.

3. A camp stove burner comprising a bottom of disk form having its peripheral edge bent to form a channel, an annulus received and secured in the channel and co-operating with the disk to provide a cup shaped outer container, a second and smaller bottom having its peripheral edge bent to provide a channel, a second annulus received in the channel and co-operating with the second bottom to provide a second and smaller cup shaped container of less height than and concentrically disposed in the first container, fastening means extending through the containers for securing them together, the upper edge of the second annulus being flared outwardly, an annular lip secured to the flared edge, wicks in the containers, and a cover for closing both the containers.

SAMUEL NATHAN.